June 20, 1944.   DE SOTO E. RICHARDSON   2,352,122
CUTTER AND COMMINUTOR FOR FRUITS AND VEGETABLES
Filed July 11, 1942
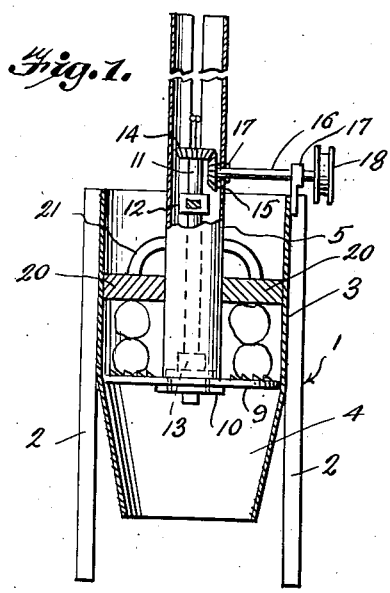
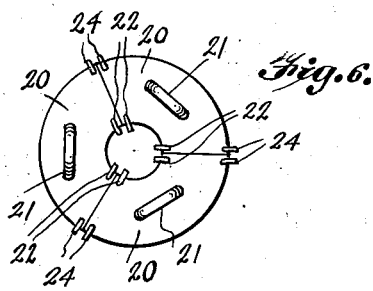
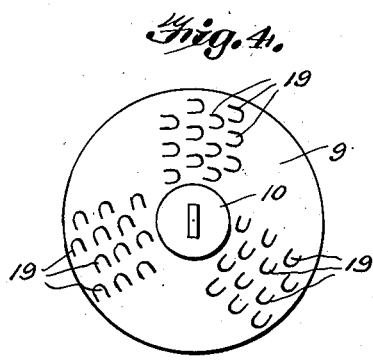
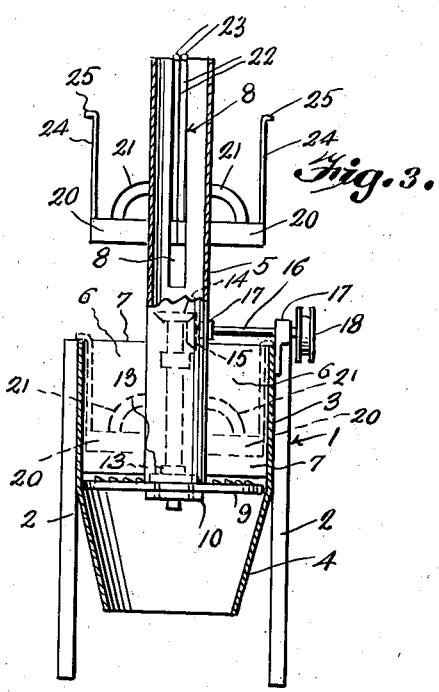
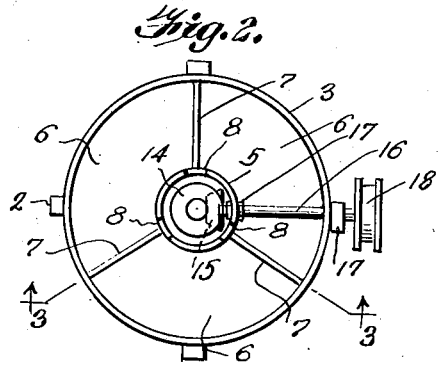
Inventor
DE SOTO E. RICHARDSON Patented June 20, 1944

2,352,122

UNITED STATES PATENT OFFICE 2,352,122

CUTTER AND COMMINUTOR FOR FRUITS AND VEGETABLES

De Soto E. Richardson, Wenatchee, Wash.

Application July 11, 1942, Serial No. 450,553

1 Claim. (Cl. 146—124)

This invention relates to improvements in cutters and comminutors for fruits and vegetables and is particularly designed for shredding or slicing apples and the like.

It is an object of the invention to provide a machine which will expedite the slicing or shredding of apples for use in restaurants, hotels and modern homes, so that quantities of fruits and vegetables may be rapidly comminuted.

Another object of the invention resides in providing a machine of the above-mentioned character which is simple and durable in construction, reliable and efficient in use and inexpensive to manufacture.

Other objects and advantages of the invention will be apparent during the course of the following description.

In the accompanying drawing forming a part of this specification and in which like numerals are employed to designate like parts throughout the same, Fig. 1 is a view partially in vertical section and partially in elevation, showing the machine in use.

Fig. 2 is a top plan view of the machine with the weights removed.

Fig. 3 is a vertical sectional view taken approximately on the line 3—3 of Fig. 2, the weights being raised.

Fig. 4 is a top view of a shredding disc.

Fig. 5 is a side view of the shredding disc shown in Fig. 4.

Fig. 6 is a top view of weights for pressing fruit against the shredding disc.

This machine has a stand indicated in general by the numeral 1 and including legs 2. A drum or container 3 for holding fruit or vegetables to be shredded is mounted in the stand and has its lower portion tapered downwardly to form a discharge spout 4 under which a pan or other receptacle may be placed to receive the shredded fruit or vegetables discharged from the drum. A tubular housing is disposed vertically in the drum in concentric relation thereto and space in the drum about the housing is divided into a plurality of compartments 6 by partitions 7 which extend radially of the housing and the drum or container. The housing 5 is of such height that it projects upwardly above the open top of the drum and in this housing are formed vertically extending slots 8. By dividing the drum or container into a number of compartments, fruit or vegetables of the same kind may be placed in all of the compartments or assorted varieties may be placed in the compartments and shredded at the same time. Since the capacity of the compartments may be ascertained, predetermined quantities of fruit or vegetables may be prepared for use by merely filling the proper number of compartments.

In order to slice or shred the fruit or vegetables in the drum or container, there has been provided a disc 9 which fits snugly within the drum under the partitions and is removably mounted upon a plate 10 at the lower end of a shaft 11. The shaft 11 extends vertically in the tubular housing 5 centrally thereof and is rotatably mounted through upper and lower bearings 12 and 13. At its upper end, the shaft carries a gear 14 meshing with a gear 15 carried by a horizontally disposed drive shaft 16, and the shaft 16 is rotatably mounted radially of the housing and the drum through bearings 17 and carries a pulley 18 at its outer end so that rotary motion may be imparted to the drive shaft. Equivalent means may be substituted in place of the pulley for imparting rotary motion to the drive shaft. Cutters 19 project from the disc 9 and extend circumferentially of the disc so that when the disc is rotating the fruit or vegetables in the drum will be sliced or shredded according to the type of teeth carried by the disc. It will be understood that a set of discs may be provided for the machine, each having a different type of teeth, and the discs selectively applied to the shaft when the machine is to be used.

When the machine is in use, fruit or vegetables in the drum should be pressed downwardly against the disc so that a good slicing or shredding action will take place. In order to do so, there have been provided weights 20 which are of segmental shape, as shown in Fig. 6, so that they will fit within the compartments defined by the partitions 7. These weights rest upon the fruit or vegetables in the compartments and apply downward pressure, each weight being provided with a hand hold or handle 21 so that they may be easily removed from the compartments when necessary. In order to guide vertical movement of the weights in the compartments there have been provided guide rods 23 which extend upwardly from inner margins of the weights and have their upper ends bent to form bills 23 which engage in the slots 8 and shift longitudinally therein as the weights move vertically.

When it is desired to suspend the weights in a raised position so that fruit or vegetables may be deposited in the compartments of the drum, the bills of the guide rods are engaged over the upper end of the housing 5 and thus suspend the weights above the drum. Other rods 24 extend upwardly from the weights at their outer margins and have their upper ends bent to form bills or hooks 25 for engaging over the upper edge of the wall of the drum and limit downward movement of the weights. Therefore, the weights cannot move downwardly in the compartments to such an extent that they will rest upon the disc and dull the cutters thereof.

Having thus described my invention, I claim:

A machine of the character described comprising a stand, a drum supported by said stand, a tubular housing disposed axially of said drum and extending above the top thereof, a vertical shaft rotatably mounted in said housing, a cutter disk secured to the lower end of said shaft, said housing having vertical slots spaced from each other circumferentially of the housing, partitions within said drum forming separate compartments, weights disposed in the compartments of said drum about said housing, guide rods extending upwardly from the weights and having portions passing through said slots and slidably connecting said weights with said housing for vertical movement, hanger rods extending upwardly from said weights and formed with hooks to engage over the edge of said drum to limit the downward movement of said weights, and means for rotating said shaft.

DE SOTO E. RICHARDSON.